(12) United States Patent
Maeda

(10) Patent No.: US 7,139,052 B2
(45) Date of Patent: Nov. 21, 2006

(54) LIQUID CRYSTAL DISPLAY DEVICE, METHOD OF MANUFACTURING THE SAME, AND ELECTRONIC APPARATUS

(75) Inventor: Tsuyoshi Maeda, Ryno-cho (JP)

(73) Assignee: Seiko Epson Corporation, Tokyo (JP)

( * ) Notice: Subject to any disclaimer, the term of this patent is extended or adjusted under 35 U.S.C. 154(b) by 49 days.

(21) Appl. No.: 10/846,703

(22) Filed: May 17, 2004

(65) Prior Publication Data
US 2005/0001962 A1    Jan. 6, 2005

(30) Foreign Application Priority Data
Jun. 6, 2003    (JP) .............. 2003-162353

(51) Int. Cl.
  *G02F 1/1337*    (2006.01)
(52) U.S. Cl. ............... 349/114; 349/129; 349/130
(58) Field of Classification Search ............... 349/114, 349/129, 130
See application file for complete search history.

(56) References Cited

U.S. PATENT DOCUMENTS

| | | | |
|---|---|---|---|
| 5,623,353 A | 4/1997 | Kanemoto et al. | |
| 6,362,863 B1 | 3/2002 | Kataoka et al. | |
| 6,753,939 B1* | 6/2004 | Jisaki et al. | 349/114 |
| 6,788,357 B1 | 9/2004 | Moon | |
| 6,806,929 B1 | 10/2004 | Chen et al. | |
| 6,924,876 B1* | 8/2005 | Kubo et al. | 349/193 |
| 2002/0012095 A1 | 1/2002 | Lee et al. | |
| 2002/0149728 A1 | 10/2002 | Ogishima et al. | |
| 2003/0016324 A1 | 1/2003 | Jisaki et al. | |
| 2004/0141117 A1* | 7/2004 | Tashiro et al. | 349/113 |
| 2004/0165129 A1* | 8/2004 | Okumura | 349/114 |
| 2004/0227876 A1* | 11/2004 | Okumara | 349/114 |

FOREIGN PATENT DOCUMENTS

| | | |
|---|---|---|
| EP | 1 248 142 A2 | 10/2002 |
| JP | A 11-101992 | 4/1999 |
| JP | A-11-242225 | 9/1999 |

(Continued)

OTHER PUBLICATIONS

Liu, Hong-Da et al., "LP-5: Late-News Poster: A Novel Design Wide View Angle Partially Reflective Super Multi-domain Homeotropically Aligned LCD," pp. 558-561, SID 02 Digest, Taiwan, 2002.

(Continued)

*Primary Examiner*—James A. Dudek
(74) *Attorney, Agent, or Firm*—Oliff & Berridge, PLC

(57) ABSTRACT

The invention provides a liquid crystal display device capable of displaying images with a wide angle in both of transmissive display and reflective display. In the liquid crystal display device, a liquid crystal layer can be interposed between a pair of substrates, and a transmissive display region and a reflective display region can be provided in one dot region. The liquid crystal layer is made of liquid crystal whose dielectric anisotropy showing that liquid crystal molecules are vertically aligned at an initial stage is negative. A liquid crystal layer thickness controlling layer for making the thickness of the liquid crystal layer in the reflective display region different from the thickness of the liquid crystal layer in the transmissive display region can be provided between the substrate and the liquid crystal layer. In the transmissive display region and the reflective display region, protrusions that protrude from the internal surface of the substrate to the inside of the liquid crystal layer are further provided. Therefore, the height of the convex portions formed in the transmissive display region is larger than the height of the convex portions formed in the reflective display region.

18 Claims, 7 Drawing Sheets

FOREIGN PATENT DOCUMENTS

| | | |
|---|---|---|
| JP | A 11-242226 | 9/1999 |
| JP | A 11-248921 | 9/1999 |
| JP | A 2000-314886 | 11/2000 |
| JP | A 2002-207227 | 7/2002 |
| JP | A 2002-350853 | 12/2002 |
| JP | A 2003-43488 | 2/2003 |
| JP | A 2003-75808 | 3/2003 |
| JP | A 2003-75839 | 3/2003 |
| KR | 2002-079583 A | 4/2006 |

OTHER PUBLICATIONS

Jisaki et al., "Development of transflective LCD for high contract and wide viewing angle by using homeotropic alignment," Asia Display, IDW, pp. 133-136, 2001.

* cited by examiner

REFLECTIVE DISPLAY REGION (R) | TRANSMISSIVE DISPLAY REGION (T)

LIQUID CRYSTAL DISPLAY DEVICE, METHOD OF MANUFACTURING THE SAME, AND ELECTRONIC APPARATUS

BACKGROUND OF THE INVENTION

1. Field of Invention

The invention relates to a liquid crystal display device, a method of manufacturing the same, and an electronic apparatus. More specifically, the invention relates to technology for obtaining a wide viewing angle in a liquid crystal display device using a homeotropic alignment liquid crystal.

2. Description of Related Art

Transflective liquid crystal display devices which include a reflective mode and a transmissive mode are known. In a transflective liquid crystal display device, a liquid crystal layer is interposed between an upper substrate and a lower substrate. A reflecting film with a light transmissive window in a metal film, such as aluminum, is provided on the internal surface of the lower substrate. The reflecting film functions as a transflective sheet. In this case, in the reflective mode, external light incident from the upper substrate is reflected from the reflecting film on the internal surface of the lower substrate after passing through the liquid crystal layer, then passes through the liquid crystal layer again and is emitted from the upper substrate to contribute to display. On the other hand, in the transmissive mode, the light from a backlight incident from the lower substrate passes through the liquid crystal layer through the window of the reflecting film and is emitted from the upper substrate to the outside to contribute to the display. Therefore, the region of the reflecting film with the window is the transmissive display region and the other region is the reflective display region.

In conventional transflective liquid crystal devices, the viewing angle in transmissive display is narrow. This is because, since a transflective sheet is provided on the internal surface of a liquid crystal cell so that parallax is not generated, only one polarizer provided on the observer side works on the reflective display which reduces the freedom of optical design. Therefore, in order to solve this problem, Jisaki et al. suggested a new liquid crystal display device using a homeotropic alignment liquid crystal. See, for example, "Development of transflective LCD for high contrast and wide viewing angle by using homeotropic alignment", M. Jisaki et al., Asia Display/IDW'01, P. 133–136 (2001). The liquid crystal display device has the following three characteristics:

(1) A vertical alignment (VA) mode, in which liquid crystal molecules with negative dielectric anisotropy are vertically aligned on a substrate and the liquid crystals fall by applying a voltage.

(2) A "multi-gap structure" is adopted, in which the thickness (a cell gap) of the liquid crystal layer in the transmissive display region is different from that of the liquid crystal layer in the reflective display region (with respect to this point, refer to Japanese Unexamined Patent Application Publication No. 11-242226).

(3) The transmissive display region is an octagon and protrusions are provided in the middle of the transmissive display region on a counter substrate so that the liquid crystal molecules fall in eight directions in the region.

See also, generally, Japanese Unexamined Patent Application Publication No. 2002-350853.

SUMMARY OF THE INVENTION

However, in the thesis of Jisaki et al., the directions in which the liquid crystal molecules in the transmissive display region fall are controlled by protrusions. However, means for controlling the directions in which the liquid crystal molecules fall do not exist in the reflective display region. Therefore, in the reflective display region, the liquid crystal molecules fall in random directions. In this case, a line of discontinuity referred to as disclination appears on the boundary of another liquid crystal alignment region, which causes afterimages. Also, since the respective alignment regions of the liquid crystal have difference visual characteristics, when the liquid crystal device is seen from a tilted direction, spots may appear.

On the other hand, it is very effective to adjust the electro-optical characteristics (transmittance-voltage characteristics and reflectance-voltage characteristics) of the transmissive display region to those of the reflective display region when the transflective liquid crystal display device includes the multi-tap structure like that in Japanese Unexamined Patent Application Publication No. 11-242226. This is because light passes through the liquid crystal layer only once in the transmissive display region but twice in the reflective display region. However, when such a multi-gap structure is employed and, at the same time, when the directions in which the liquid crystal molecules fall are controlled using the above-mentioned protrusions, since the thickness in the transmissive display region is different from the thickness in the reflective display region, it is not possible to control sufficiently the alignment of the liquid crystal molecules in any one region only by providing the protrusions in the respective regions.

It is an object of the invention to provide a transflective liquid crystal display device using homeotropic alignment liquid crystal capable of displaying images with a wide viewing angle in both of transmissive display and reflective display and a method of manufacturing the same. It is another object of the invention to provide a reliable transflective liquid crystal display device using homeotropic alignment liquid crystal whose structure is simplified, thus improving the manufacturing efficiency and reducing the occurrence of inferior quality, a method of manufacturing the same, and an electronic apparatus comprising the above-mentioned liquid crystal display device.

In order to achieve the objects, there can be provided a liquid crystal display device in which a liquid crystal layer is interposed between a pair of substrates, and a transmissive display region and a reflective display region are provided in one dot region. The liquid crystal layer can be made of liquid crystal whose dielectric anisotropy, indicating that liquid crystal are vertically aligned in an initial state, is negative. A liquid crystal layer thickness-adjusting layer to make the thickness of the liquid crystal layer in the reflective display region smaller than the thickness of the liquid crystal layer in the transmissive display region can be formed between at least one substrate of the pair of substrates and the liquid crystal layer. Convex portions that protrude from the internal surface of the substrates to the inside of the liquid crystal layer are formed in the transmissive display region and the reflective display region, and wherein the height of the convex portions is larger in the transmissive display region than in the reflective display region.

The liquid crystal display device according to the invention can be obtained by combining liquid crystal in a vertical alignment mode with a transflective liquid crystal display device and by adding a liquid crystal layer thickness-adjusting layer (that is, a multi-gap structure) to the transflective liquid crystal display device for making birefringence retardation of a reflective display region almost equal to that of a transmissive display region and thus control the directions of the alignment of liquid crystal molecules.

In other words, according to the liquid crystal display device in the vertical alignment mode, liquid crystal molecules that are vertically erect with respect to the substrate in an initial state fall by applying an electric field. When nothing is designed (when pre-tilt is not given), the directions in which the liquid crystal molecules fall cannot be controlled and disorder (disclinations) in the alignment is caused which generates display problems such as light leakage and deteriorates display quality. Therefore, when a vertical alignment mode is employed, control of the directions in which the liquid crystal molecules are aligned when the electric field is applied is an important factor. Therefore, in the liquid crystal display device according to the present invention, a convex portion is formed in both the transmissive display region and the reflective display region. The directions in which the liquid crystal molecules are aligned in the each region are regulated.

According to such alignment regulation, the liquid crystal molecules are vertically aligned in an initial state and have pre-tilt according to the shape of the convex portion. As a result, it is possible to regulate or control the directions in which the liquid crystal molecules fall in both the transmissive display region and the reflective display region. Therefore, it is difficult to cause the disorder (disclinations) in the alignment and it is possible to avoid the inferiority in the display such as light leakage. As a result, it is possible to reduce problems such as afterimages and spots and provide a liquid crystal display device with a wide viewing angle.

Also, since the multi-gap structure is employed in the liquid crystal display device according to the invention, a thickness of the liquid crystal layer in the transmissive display region is larger than the thickness of the liquid crystal layer in the reflective display region. Therefore, it may be impossible to control sufficiently the alignment of the liquid crystal in any one region only by providing the convex portions in both of the transmissive display region and the reflective display region. In other words, since the thickness of the liquid crystal layer in the transmissive display region is different from the thickness of the liquid crystal layer in the reflective display region, an ability of aligning the liquid crystal molecules in the transmissive display region where the thickness of the liquid crystal layer is larger may deteriorate than that in the reflective display region only by forming the convex portions having the same height in the respective regions.

Therefore, according to the invention, it is possible to control the alignment of the liquid crystal molecules in both of the transmissive display region and the reflective display region by making the height of the convex portions in the transmissive display region larger than the height of the convex regions in the reflective display region. Therefore, it is possible to prevent the generation of inferiority in display such as afterimages or spots in both of the transmissive mode and the reflective mode and to thus display images with a wide viewing angle. Also, according to the present invention, for example, the internal surface of the substrate means the liquid crystal layer side of the substrate. That the convex portions protrude above the substrates means that the convex portions protrude from the internal surface of the liquid crystal layer thickness-adjusting layer when the liquid crystal layer thickness-adjusting layer is formed on the internal surface of the substrate.

In the liquid crystal display device according to the invention, the convex portions can be provided as alignment regulating device for regulating the alignment of the liquid crystal and have surfaces inclined at a predetermined angle with respect to the surfaces of the substrate for interposing the liquid crystal layer therebetween. It is possible to control the directions in which the liquid crystal molecules fall along the tilted surface by including the tilted surfaces. Also, electrodes for driving the liquid crystal are provided on the liquid crystal layer sides of the pair of substrates, and the convex portions are formed on at least one electrode of the electrodes facing the liquid crystal layer. In this case, an alignment film for vertically aligning the liquid crystal is formed on the convex portions and the internal surface of the electrode. It is possible to provide a circular polarizer for making circularly polarized light incident on the liquid crystal layer on the sides of the pair of substrates opposite to the liquid crystal layer. The circular polarizer may be obtained by composing the polarization layer with the retardation layer.

Furthermore, in the liquid crystal display device according to the invention, an upper substrate and a lower substrate are provided as the pair of substrates, a backlight for transmissive display is provided on the side of the lower substrate opposite to the liquid crystal layer, and a reflective layer selectively formed in the reflective display region is formed on the side of the lower substrate facing the liquid crystal layer. In this case, it is possible to use the light from the backlight, which is incident from the lower substrate, for the transmissive display and to reflect external light, such as illumination, and solar light incident from the upper substrate in the reflective layer to thus be used for the reflective display.

A color filter layer can be provided on the liquid crystal layer sides of at least one of the pair of substrates. The color filter layer has a plurality of colored layers (for example, colored layers corresponding to three primary colors of light). The plurality of colored layers overlap each other in the inter-dot region in plan view. In this case, it is possible to display black by the colored layer (referred to as an overlap colored layer) formed by overlapping the colored layers of the three primary colors of light and to use the overlap colored layer as a black matrix in the inter-dot region. Therefore, since it is not necessary to additionally form the black matrix, it is possible to simplify the structure of the liquid crystal display device and to improve manufacturing efficiency.

The liquid crystal layer thickness-adjusting layer and second convex portions that protrude from the liquid crystal layer thickness-adjusting layer to the liquid crystal layer are formed on the side of the liquid crystal layer in the region where the colored layers overlap each other in plan view. In this case, the second convex portions can be used instead of the spacers, that is, as a device for controlling the thickness of the liquid crystal layer (the distance between substrates, that is, the cell gap). The region formed by overlapping the colored layers protrudes above the other regions by the amount the colored layers overlap. However, when the liquid crystal layer thickness-adjusting layer is formed in the overlap colored layer together with the second convex portion, since the second convex portions protrude outermost inside the substrate, it is possible to use the second convex portions as the means for controlling the thickness of the liquid crystal layer.

Also, the second convex portions are preferably formed in the same step as the convex portions formed in the transmissive display region and the reflective display region in order to improve the manufacturing efficiency. In this case, the convex portions formed in the transmissive display region and the reflective display region are made of the same material as the second convex portion. Also, the height of the second convex portions is almost equal to that of the convex portions formed in the transmissive display region and the reflective display region. In this case, it is possible to use the second convex portions as the device for controlling the thickness of the liquid crystal layer. On the other hand, since the convex portions formed in the transmissive display region and the reflective display region have the height almost equal to the height of the second convex portion, it is possible to prevent the convex portions from contacting an opposite substrate, and to thus control the alignment of the liquid crystal molecules.

An electronic apparatus according to the invention can include the above-mentioned liquid crystal display device. Such an electronic apparatus can operate in the transmissive mode and the reflective mode. Therefore, it is possible to provide an electronic apparatus having a display in which images can be displayed with a wide viewing angle in both of the display modes.

In addition, a method of manufacturing the liquid crystal display device according to the invention can include a convex portion forming step of coating a substrate with a photosensitive resin, and exposing and developing the photosensitive resin through a mask. The thickness of the photosensitive resin with which the substrate is coated varies in every predetermined region. According to such a manufacturing method, it is possible to appropriately manufacture the liquid crystal display device according to the invention. In other words, in the above-mentioned liquid crystal display device, the convex portions provided in both of the transmissive display region and the reflective display region are made of the photosensitive resin and the thickness of the photosensitive resin varies in every predetermined region. Therefore, it is possible to form convex portions having different heights in the respective regions. To be specific, the thickness of the photosensitive resin is larger in the region where the transmissive display region is formed and the thickness of the photosensitive resin layer is relatively small in the region where the reflective display region is formed. To be more specific, the manufacturing method may further include a substrate fabricating step of forming a reflective film of a predetermined pattern on a base. In the region where the reflective film is formed, the thickness of the photosensitive resin may be relatively small.

According to another aspect, the method of manufacturing the liquid crystal display device according to the invention can include a convex portion forming step of coating a substrate with a photosensitive resin, and exposing and developing the photosensitive resin through a mask. The amount of exposure of the photosensitive resin varies in every predetermined region. According to such a manufacturing method, it is possible to appropriately manufacture the liquid crystal display device according to the invention. That is, in the above-mentioned liquid crystal display device, the convex portions provided in both of the transmissive display region and the reflective display region are made of the photosensitive resin and the amount of exposure of the photosensitive resin varies in every predetermined region. Therefore, it is possible to form convex portions having different heights in the respective regions. To be specific, when a negative photosensitive resin is used, the amount of exposure increases in the region that forms the transmissive display region and decreases in the region that forms the reflective display region. To be more specific, the manufacturing method may further include a substrate fabricating step of forming the reflective film of the predetermined pattern on the base material. The amount of exposure of the photosensitive resin may vary in each of the region in which the reflective film is formed and the region in which the reflective film is not formed.

The manufacturing method according to the invention may further include a step of forming the color filter layer including the plurality of colored layers corresponding to the three primary colors of light on the base material. In the color filter layer forming step, the plurality of colored layers may overlap each other in the inter-dot region in plan view. On the other hand, the manufacturing method may further include a step of forming an insulating layer so as to cover the colored layers that overlap each other and forming second convex portions protruding from the insulating layer, above the insulating layer. The convex portions and the second convex portions can be formed in the same step. In this case, since the second convex portions for controlling the thickness of the liquid crystal layer is formed in the same step as the convex portions (first convex portions) for controlling the alignment of the liquid crystal molecules formed in the transmissive display region and the reflective display region, it is possible to improve the manufacturing efficiency and to easily and correctly make the height of the second convex portions almost equal to the height of the first convex portions. Also, the insulating layer is for forming the liquid crystal layer thickness-adjusting layer according to the present invention.

According to the method of manufacturing the liquid crystal display device of the invention, a liquid crystal layer is interposed between a pair of substrates and a transmissive display region and a reflective display region are provided in one dot region. The method can include a first substrate forming step of forming a reflective film of a predetermined pattern on a base material and forming an insulating layer on the region in which the reflective film is formed, a convex portion forming step of forming convex portions on at least one of the first substrate and a second substrate different from the first substrate, and an attaching step of attaching the first substrate to the second substrate, with the liquid crystal layer therebetween whose dielectric anisotropy, indicating that the liquid crystal is vertically aligned in an initial state, is negative. The convex portion forming step can include the steps of coating the first substrate and/or the second substrate with the photosensitive resin, and exposing and developing the photosensitive resin through a mask. The thickness of the photosensitive resin with which the substrate is coated in the region where the reflective film is formed is different from the thickness of the photosensitive resin in the region in which the reflective film is not formed. According to such a manufacturing method, it is possible to provide a transflective liquid crystal display device having a multi-gap structure and employing liquid crystal of a vertical alignment mode, in which it is possible to appropriately control the directions in which the liquid crystal molecules are aligned in both of the transmissive display region and the reflective display region.

According to another aspect, in the method of manufacturing the liquid crystal display device of the invention, a liquid crystal layer is interposed between a pair of substrates and a transmissive display region and a reflective display region are provided in one dot region. The method can include a first substrate forming step of forming a reflective film of a predetermined pattern on a base material and forming an insulating layer on the region in which the reflective film is formed, a convex portion forming step of forming convex portions on at least one of the first substrate and a second substrate different from the first substrate, and an attaching step of attaching the first substrate to the second substrate, with a liquid crystal layer therebetween whose dielectric anisotropy, indicating that liquid crystal is vertically aligned in an initial state, is negative. The convex portion forming step includes the steps of coating the first substrate and/or the second substrate with the photosensitive resin, and exposing and developing the photosensitive resin through a mask. The amount of exposure of the photosensitive resin in the region in which the reflective film is formed is different from the amount of exposure of the photosensitive resin in the region in which the reflective film is not formed. According to such a manufacturing method, it is possible to provide a transflective liquid crystal display device having a multi-gap structure and employing liquid crystal of a vertical alignment mode, in which it is possible to appropriately control the directions in which the liquid crystal molecules are aligned in both of the transmissive display region and the reflective display region.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Figure 1:
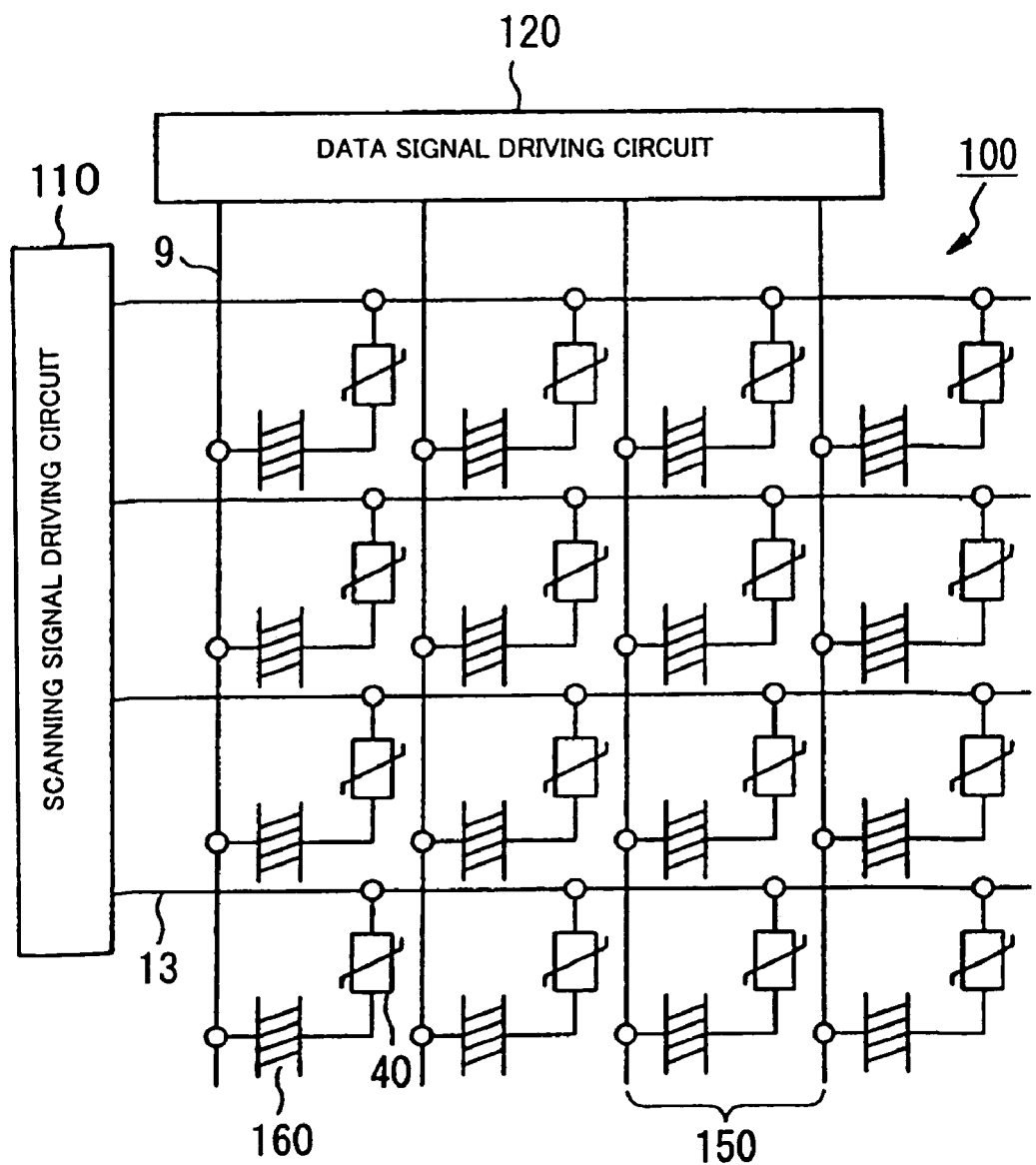
FIG. 1 is an equivalent circuit diagram of a liquid crystal display device according to a first embodiment.

The embodiments of the invention will now be further described with reference to the drawings. In the drawings, it should be understood that the thickness of individual layers and regions are exaggerated for clarity.

A liquid crystal display device according to the embodiment of the invention is an active matrix liquid crystal display device using a thin film diode (TFD) as a switching element, in particular, a transflective liquid crystal display device capable of performing reflective and transmissive display.

FIG. 1 is an equivalent circuit diagram of a liquid crystal display device 100 according to the present embodiment. The liquid crystal display device 100 includes a scanning signal driving circuit 110 and a data signal driving circuit 120. Signal lines, that is, a plurality of scanning lines 13 and a plurality of data lines 9 that cross the scanning lines 13 are provided in the liquid crystal display device 100. The scanning lines 13 are driven by the scanning signal driving circuit 110. The data lines 9 are driven by the data signal driving circuit 120. In the respective pixel regions 150, TFD elements 40 are serially connected to liquid crystal display components (liquid crystal layers) 160 between the scanning lines 13 and the data lines 9. On the other hand, in FIG. 1, the TFD elements 40 are connected to the scanning lines 13 and the liquid crystal display elements 160 are connected to the data lines 9. However, on the contrary, the TFD elements 40 may be connected to the data lines 9 and the liquid crystal display components 160 may be connected to the scanning lines 13.

Figure 2:
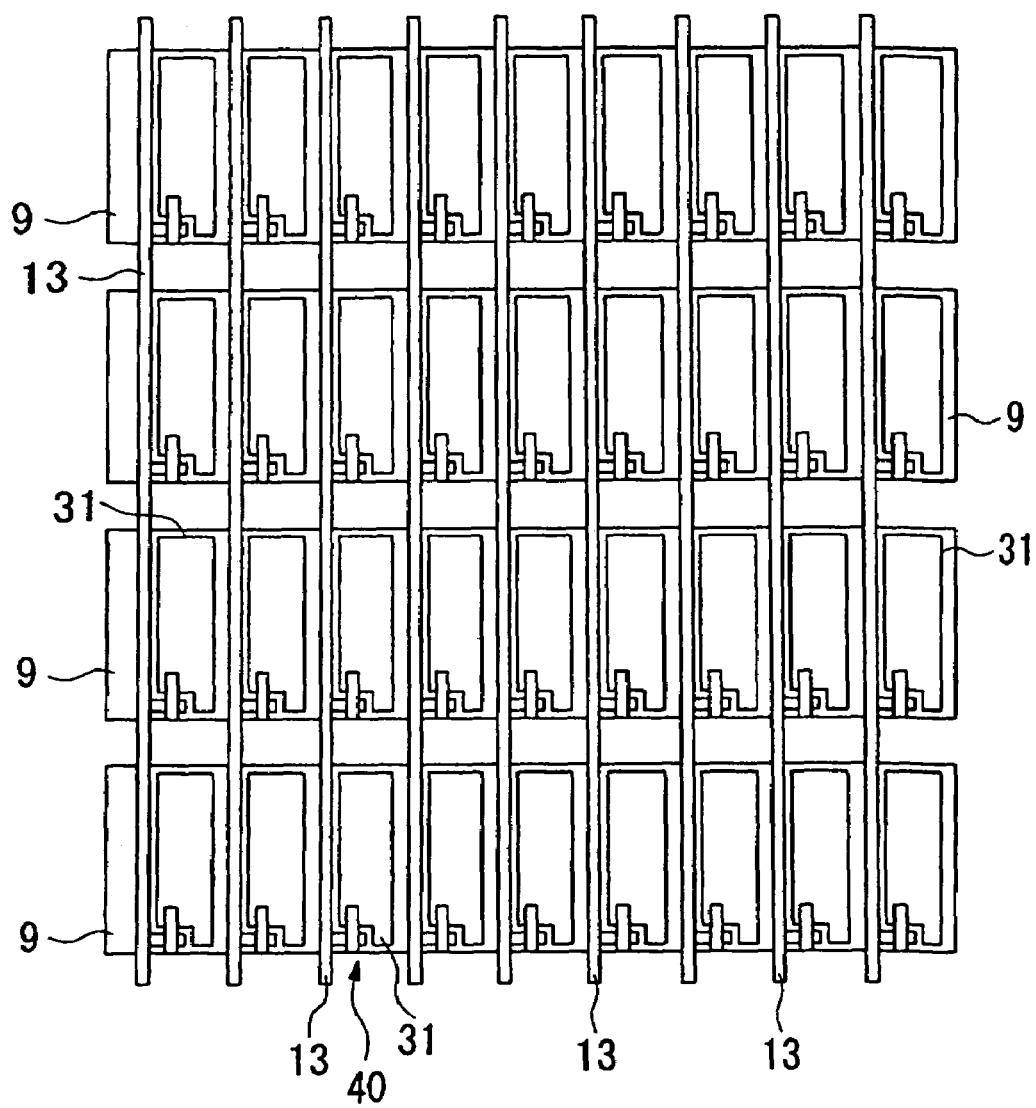
FIG. 2 is a plan view illustrating the structure of the electrodes of the liquid crystal display device of FIG. 1.

Hereinafter, with reference to FIG. 2, the planar structure of the electrodes included in the liquid crystal display device according to the embodiment will now be described. As illustrated in FIG. 2, in the liquid crystal display device according to the embodiment, in plan view where the TFD elements 40 are connected to the scanning lines 13, square pixel electrodes 31 are provided in a matrix and the rectangular common electrodes 9 (in a matrix) are provided to face the pixel electrodes 31 in a direction vertical to the plane of the drawing. The common electrodes 9 are composed of the data lines and cross the scanning lines 13 in strips. According to the embodiment, each region in which each of the pixel electrodes 31 is formed constitutes one dot region, and images can be displayed in each of the dot regions arranged in a matrix.

Here, the TFD elements 40 are switching elements for connecting the scanning lines 13 to the pixel electrodes 31. The TFD elements 40 have an MIM structure in which a first conductive film using Ta as a main component, an insulating film formed on the surface of the first conductive film and using $Ta_2O_3$ as a main component, and a second conductive film formed on the surface of the insulating film and using Cr as a main component are provided. The first conductive films of the TFD elements 40 are connected to the scanning lines 13 so that the second conductive films are connected to the pixel electrodes 31.

Next, the pixel structure of the liquid crystal display device 100 according to the present embodiment will now be described with reference to FIG. 3. FIG. 3(*a*) is a schematic view illustrating the pixel structure of the liquid crystal display device 100, in particular, the planar structure of the pixel electrode 31. FIG. 3(*b*) is a schematic view taken along the line A–A' of FIG. 3(*a*). As illustrated in FIG. 2, the liquid crystal display device 100 according to the embodiment has the dot regions including the pixel electrodes 31 in the regions surrounded by the data lines 9 and the scanning lines 13. In, the dot regions, as illustrated in FIG. 3(*a*), a colored layer of one of three primary colors is arranged corresponding to one dot region. The three dot regions D1, D2, and D3 form a pixel including colored layers 22B (blue), 22G (green), and 22R (red).

On the other hand, as illustrated in FIG. 3(*b*), in the liquid crystal display device 100 according to the embodiment, liquid crystal whose molecules are vertically aligned in an initial state, that is, a liquid crystal layer 50 made of a liquid crystal material whose dielectric anisotropy is negative, is interposed between an upper substrate (an element substrate) 25 and a lower substrate (a counter substrate) 10 arranged to face the upper substrate.

The lower substrate 10 has a structure in which a reflecting film 20 made of a metal film having a high reflectance, such as aluminum or silver, is partially formed on the surface of a substrate main body 10A made of a light transmissive material, such as quartz or glass, with an insulating film 24 therebetween. Here, the region in which the reflecting film 20 is formed constitutes a reflective display region R. The region in which the reflecting film 20 is not formed, that is, the region inside an aperture 21 of the reflecting film 20, is a transmissive display region T. As mentioned above, the liquid crystal display device according to the embodiment is a vertical alignment liquid crystal display device including the vertical alignment liquid crystal layer 50 and is a transflective liquid crystal display device capable of displaying images in a reflective mode and in a transmissive mode.

The insulating film 24 formed on the substrate main body 10A has a concavo-convex portion 24a on the surface thereof. The surface of the reflecting film 20 also has a concavo-convex portion due to the concavo-convex portion 24a.

Since reflected light is scattered due to such a concavo-convex portion, it is possible to prevent the reflected light from being incident from the outside and to thus display images with a wide viewing angle.

Figure 3A:
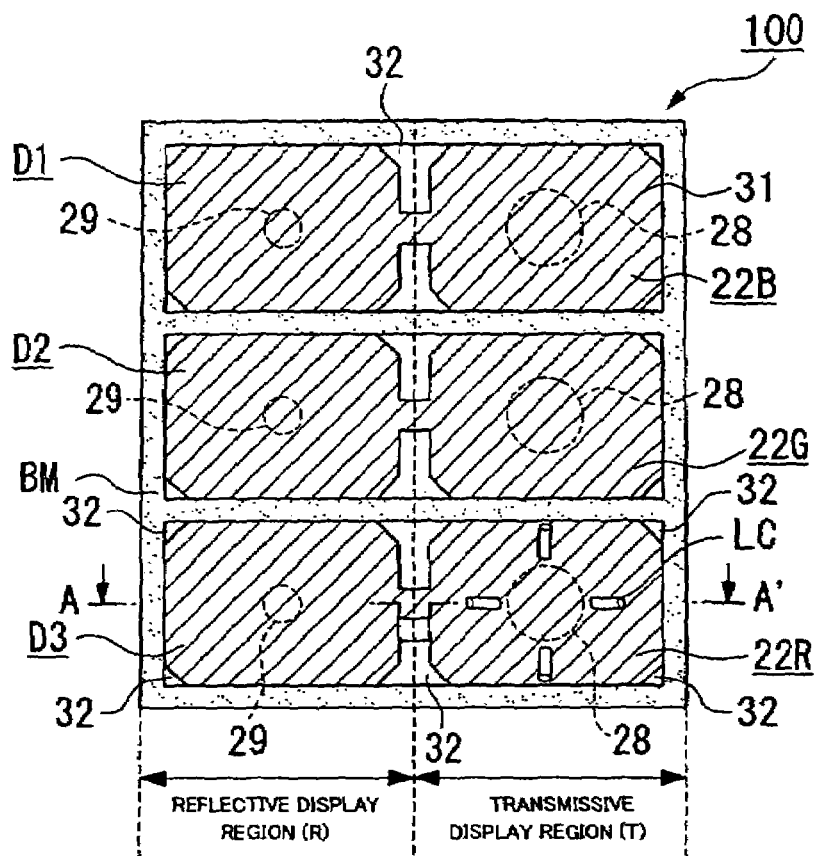
FIG. 3 is a plan schematic view and a sectional schematic view illustrating the enlarged main portion of the liquid crystal display device of FIG. 1.
Figure 3B:
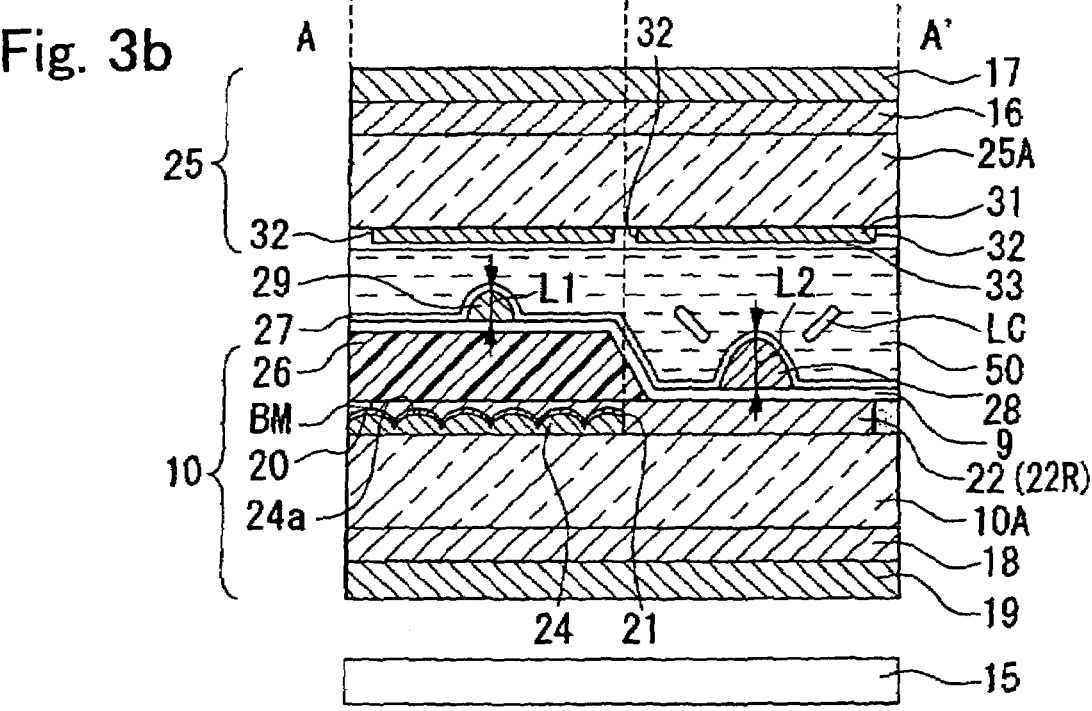

Also, the color filter 22 (the red colored layer 22R in FIG. 3(b)) extending over the reflective display region R and the transmissive display region T is provided on the reflecting film 20 in the reflective display region R and on the substrate main body 10A positioned in the transmissive display region T. Here, the edge of the colored layer 22R is surrounded by a black matrix BM composed of chromium or the like. The boundaries of the respective dot regions D1, D2, and D3 are formed by the black matrix BM (refer to FIG. 3(a)).

Furthermore, an insulating film 26 is formed on the color filter 22 so as to correspond to the reflective display region R. In other words, the insulating film 26 is selectively formed above the reflecting film 20, with the color filter 22 therebetween. The thickness of the liquid crystal layer 50 in the reflective display region R is different from the thickness of the liquid crystal layer 50 in the transmissive display region T due to the formation of the insulating film 26. The insulating film 26 is made of an organic film such as an acryl resin of a thickness of 0.5 to 2.5 µm and has a tilted surface so that the thickness thereof can continuously change around the boundary between the reflective display region R and the transmissive display region T. The thickness of the liquid crystal layer 50 in a portion where the insulating film 26 does not exist is about 1 to 5 µm. The thickness of the liquid crystal layer 50 in the reflective display region R is about half of the thickness of the liquid crystal layer 50 in the transmissive display region T.

As mentioned above, the insulating film 26 functions as a liquid crystal layer thickness-adjusting layer (a liquid crystal layer thickness-controlling layer) that makes the thickness of the liquid crystal layer 50 in the reflective display region R different from the thickness of the liquid crystal layer in the transmissive display region T. According to the present embodiment, since the edge of the flat surface on the insulating film 26 almost coincides with the edge of the reflecting film 20 (the reflective display region), a part or all of the tilted region of the insulating film 26 is included in the transmissive display region T.

A common electrode 9 made of indium tin oxide (ITO) is formed on the surface of the lower substrate 10 including the surface of the insulating film 26. An alignment film 27 made of polyimide is formed on the common electrode 9. The alignment film 27 functions as a vertical alignment film for aligning the liquid crystal molecules in a vertical direction with respect to the surface thereof. An alignment process such as rubbing is not performed. On the other hand, in FIG. 3, the common electrode 9 is in strips so as to extend in a vertical direction with respect to the plane of the drawing and is composed of common electrodes in the respective dot regions formed in parallel in a vertical direction with respect to the plane of the drawing. Furthermore, according to the embodiment, the reflecting film 20 and the common electrode 9 are separately provided and stacked. However, in the reflective display region R, a reflecting film made of a metal film may be used as a part of the common electrode.

Next, in the upper substrate 25, the pixel electrode 31 in a matrix, which is made of a transparent conductive film, such as ITO, and an alignment film 33, which is made of polyimide and on which the vertical alignment process is performed like on the lower substrate 10, are formed on a substrate main body 25A made of a light transmissive material, such as glass or quartz (on the liquid crystal layer of the substrate main body 25A). Also, in the pixel electrode 31, slits 32 obtained by partially cutting the common electrode are formed.

A retardation plate 18 and a polarizer 19 are formed on the external surface (opposite to the surface on which the liquid crystal layer 50 is provided) of the lower substrate 10. A retardation plate 16 and a polarizer 17 are formed on the external surface of the upper substrate 25. Circular polarized light can be incident on the internal surface of the substrate (the liquid crystal layer 50). The retardation plate 18 and the polarizer 19, and the retardation plate 16 and the polarizer 17 constitute circular polarizers, respectively. The polarizer 17(19) transmits only linearly polarized light having a polarization axis in a predetermined direction. A λ/4 retardation plate can be used as the retardation plate 16(18). A backlight 15 that is a light source for the transmissive display is provided outside the polarizer 19 formed on the lower substrate 10.

In the liquid crystal display device 100 according to the embodiment, in order to control the alignment of the liquid crystal molecules of the liquid crystal layer 50, that is, as means for controlling the directions in which the liquid crystal molecules that are vertically aligned in an initial state fall when a voltage is applied between electrodes, protrusions made of a dielectric material are formed on the internal surface (the liquid crystal layer) of the electrodes. In FIG. 3, the protrusions 28 and 29 are formed on the internal surface (the liquid crystal layer) of the common electrode 9 formed in the lower substrate 10 in both the transmissive display region T and the reflective display region R, respectively.

The respective protrusions 28 and 29 are cone-shaped or polypyramid-shaped so as to protrude from the internal surface of the substrate (the main surface of the electrode) to the inside of the liquid crystal layer 50. The height L2 of the protrusions 28 formed in the transmissive display region T is (for example, 1.5 to 2 times) larger than the height L1 of the protrusions 29 formed in the reflective display region R. To be specific, L2=1.5 µm and L1=1.0 µm. The height of the protrusions 28 is about 1.5 times larger than the height of the protrusions 29. Also, the protrusions 28 and 29 include a surface (including a slowly curved shape) tilted at a predetermined angle with respect to the internal surface of the substrate (the main surface of the electrode).

On the other hand, in the pixel electrode 31 formed on the internal surface of the upper substrate 25, the slits 32 obtained by partially cutting the common electrode 9 are formed. A distorted electric field is generated between the respective electrodes 9 and 31 by providing the slits 32. The directions in which the liquid crystal molecules vertically aligned in an initial state fall when a voltage is applied are controlled by the distorted electric field. Also, as illustrated in FIG. 3(a), the slits 32 formed in the pixel electrode 31 surround the protrusions 28 and 29 formed in the common electrode 9. As a result, it is possible to radically control the directions in which the liquid crystal molecules (LC) fall along the periphery of the protrusions 28 and 29.

According to the liquid crystal display device 100 having the above structure, it is possible to obtain the following effects. In other words, in general, when a voltage is applied to the liquid crystal molecules having negative dielectric anisotropy, which are aligned on a vertical alignment film on which a rubbing process is not performed, since the directions in which the liquid crystal molecules fall are not controlled, the liquid crystal molecules fall in random directions to thus cause inferior alignment. However, according to the present embodiment, since the protrusions 28 and 29 are formed on the internal surface of the common electrode 9 and the slits 32 are formed in the pixel electrode 31 so as to surround the protrusions 28 and 29 in plan view, the alignment of the liquid crystal molecules is controlled by the tilted surfaces of the protrusions 28 and 29 and/or by the distorted electric field caused by the slits 32. Therefore, the directions in which the liquid crystal molecules vertically aligned at an initial stage fall are controlled by applying a voltage. As a result, it is possible to prevent the generation of disclinations caused by the inferior alignment of the liquid crystal molecules and to thus obtain high quality display in which afterimages caused by the generation of the disclinations or spots observed in the oblique direction are rarely generated.

In addition, in the liquid crystal display device 100 according to the embodiment, since it is possible to reduce the thickness of the liquid crystal layer 50 in the reflective display region R to half of the thickness of the liquid crystal layer 50 in the transmissive display region T by forming the insulating film 26 in the reflective display region R, it is possible to make the birefringence retardation that contributes to the reflective display almost equal to the birefringence retardation that contributes to the transmissive display, and to thus improve the contrast.

In the liquid crystal display device 100 in which the thickness of the liquid crystal layer in the transmissive display region T is larger than the thickness of the liquid crystal layer in the reflective display region R, it is possible to control the alignment of the liquid crystal molecules in both of the transmissive display region T and the reflective display region R by making the height L2 of the protrusions 28 formed in the transmissive display region T larger than the height of the protrusions 28 formed in the reflective display region R. Therefore, it is possible to prevent the generation of the inferiority in display such as the afterimages and the spots in both of the transmissive mode and the reflective mode and to thus display images a wide viewing angle.

In other words, in the liquid crystal display device in which the thickness of the liquid crystal layer in the transmissive display region is larger than the thickness of the liquid crystal layer in the reflective display region, it is not possible to control the alignment of the liquid crystal molecules in any one region only by providing the protrusions in both of the transmissive display region and the reflective display region. That is, since the thickness of the liquid crystal layer in the transmissive display region is different from the thickness of the liquid crystal layer in the reflective display region, the power of aligning the liquid crystal molecules in the transmissive display region where the thickness of the liquid crystal layer is larger may deteriorate than that in the reflective display region only by forming the convex portions having the same height in the respective regions. However, according to the present embodiment, it is possible to control the alignment of the liquid crystal molecules in the respective regions by making the height L2 about 1.5 μm and the height L1 about 1.0 μm.

Next, one manufacturing process of the liquid crystal display device 100 according to the first embodiment will now be described with reference to FIG. 3(b). The process of manufacturing the liquid crystal display device 100 includes a process of manufacturing a lower substrate 10, a process of manufacturing an upper substrate 25, and a process of attaching the lower substrate 10 to the upper substrate 25, with a liquid crystal material therebetween. The respective processes will now be described in detail.

First, an insulating film 24 made of an acryl resin can be formed on a base material corresponding to the substrate main body 10A in a predetermined pattern (in a region corresponding to the reflective display region R). A concavo-convex portion 24a is formed on the surface thereof by a photolithography process using a photomask, a treatment with hydrofluoric acid, or an embossing process. Next, a reflective film 20 mainly made of a metal material, such as Al, is formed on the insulating film 24. A concavo-convex portion is formed on the surface of the reflective film 20 in the shape of the concavo-convex portion 24a of the insulating film 24. Subsequently, a color filter 22 including colored layer of R, G, and B colors is formed on the almost entire surface of the substrate main body 10A having the insulating film 24 and the reflective film 20.

After forming the color filter 22, an insulating film 26 that is a liquid crystal layer thickness-adjusting layer mainly made of the acryl resin is selectively formed so as to cover the color filter 22 in the region where the reflective film 20 is formed. Then, a transparent electrode 9 in strips mainly made of ITO is formed on the substrate main body 10A having the insulating film 24, the reflective film 20, the color filter 22, and the insulating film 26 by a sputtering method or a deposition method. Also, a pattern in strips may be formed by mask deposition or etching.

Subsequently, the protrusions 29 and the protrusions 28 made of a dielectric material are formed on the transparent electrode 9 formed on the substrate main body 10A in both of the region where the reflective film 20 is formed and the region where the reflective film 20 is not formed. Here, the height of the protrusions 28 that protrude from the surface of the transparent electrode 9 is different from the height of the protrusions 29 that protrude from the surface of the transparent electrode 9. According to the embodiment, for example, the height L2 of the protrusions 28 is 1.5 times larger than the height L1 of the protrusions 29.

To be specific, after forming a photosensitive resin hardened by irradiating UV rays on the transparent electrode 9 formed on the substrate main body 10A to be thicker in the region where the reflective film 20 is formed than in the region where the reflective film 20 is not formed, the photosensitive resin is exposed and developed through a mask and the resultant is processed to cones. Therefore, it is possible to form the protrusions 29 that are lower in the region where the reflective film 20 is formed and to form the protrusions 28 that higher in the region where the reflective film 20 is not formed. Also, according to a method of providing the tilted surfaces illustrated in FIG. 3(b) in the protrusions 28 and 29, that is, a method of processing the resultant to the cones, for example, it is possible to process the convex portions obtained after performing exposure and development by melting the same.

It is possible to make the heights of the protrusions 28 and 29 different from each other by coating the transparent electrode 9 formed on the substrate main body 10A with a photosensitive resin hardened by irradiating the UV rays to a uniform thickness and controlling the amount of exposure when the photosensitive resin is exposed through the mask.

That is, when the photosensitive resin hardened by irradiation the UV rays is used, it is possible to make the height of the protrusions 29 formed in the region where the reflective film 20 is formed smaller by reducing the amount of exposure in the region where the reflective film 20 is formed and increasing the amount of exposure I the region where the reflective film 20 is not formed.

An alignment film 27 of vertical alignment made of polyimide is formed on the almost entire surface of the transparent electrode 9 including the protrusions 28 and 29 formed by the above-mentioned method. Also, an alignment process such as rubbing is not performed on the alignment film 27.

On the other hand, a retardation film 18 and a polarization film 19 made of a 1/4 wavelength plate are formed on the surface opposite to the surface on which the transparent electrode 9 of the substrate main body 10A is formed to thus obtain the lower substrate 10.

First, a transparent electrode (pixel electrode) 31 in a matrix, which is mainly made of the ITO, is formed on a base material corresponding to the substrate main body 25A by a sputtering method or a deposition method.

Also, a pattern in a matrix may be formed by the mask deposition or the etching. The slits 32 are formed at the same time of forming the pattern in a matrix. Subsequently, an alignment film 33 of vertical alignment made of polyimide is formed on the almost entire surface of the transparent electrode 31 formed on the substrate main body 25A. Also, the alignment process such as rubbing is not performed on the alignment film 33.

On the other hand, a retardation plate 16 and a polarization plate 17 made of the 1/4 wavelength plate are formed on the surface opposite to the surface on which the transparent electrode 31 of the substrate main body 25A is formed to thus obtain the upper substrate 25.

The upper substrate 25 and the lower substrate 10 obtained by the above method are attached to each other under vacuum through a sealing material made of a UV rays hardening resin, in which a liquid crystal implanting hole is formed. A liquid crystal material is implanted into the attached substrates from the liquid crystal implanting hole by a vacuum implanting method. After implanting the liquid crystal material, the liquid crystal implanting hole is sealed by the sealing material to thus obtain the liquid crystal display device 100 according to the embodiment. Also, according to the embodiment, a liquid crystal material whose dielectric anisotropy is negative is used as the liquid crystal material.

A liquid crystal display device according to a second embodiment will now be described with reference to the drawings. FIG. 4 is a schematic view illustrating the planar structure (a) and the sectional structure (b) of the liquid crystal display device 200 according to the second embodiment corresponding to FIG. 3 according to the first embodiment. The structure of the liquid crystal display device 200 according to the second embodiment is almost identical with the structure of the liquid crystal display device 100 illustrated in FIG. 3 excluding that the structures of the color filters vary. Therefore, description of the same members denoted by the reference numerals of FIG. 3 will be omitted.

In the liquid crystal display device 200 according to the second embodiment, in an active matrix transflective liquid crystal display device using a TFD as a switching element, liquid crystal whose molecules are vertically aligned in an initial state, that is, a liquid crystal layer 50 made of a liquid crystal material whose dielectric anisotropy is negative, is interposed between an upper substrate (an element substrate) 25 and a lower substrate (a counter substrate) 10 arranged to face the upper substrate.

In the lower substrate 10, the reflective film 20 made of a metal film having a high reflectance ratio, such as aluminum and silver, is selectively formed on the surface of the substrate main body 10A made of a light transmissive material such as quartz and glass in a predetermined pattern, to be specific, in the reflective display region R. Also, like in the first embodiment, it is possible to form a concavo-convex portion through the insulating film 24.

The color filter 22 (22R, 22G, and 22B) extending over the reflective display region R and the transmissive display region T is provided on the reflecting film 20 selectively formed in the reflective display region R and on the substrate main body 10A positioned in the transmissive display region T. The color filter 22 includes the colored layers 22R, 22G, and 22B of the R, G, and B colors. The respective colored layers 22R, 22G, and 22B form the respective dot regions D1, D2, and D3 (refer to FIG. 4(a)).

According to the embodiment, the black matrix BM formed in the boundaries of the respective dot regions D1, D2, and D3 is not formed of metal chrome that is generally used in a conventional art but is formed of a substance obtained by stacking the respective colored layers 22R, 22G, and 22B. To be specific, in the inter-dot region adjacent to the reflective display region R, the respective colored layers 22R, 22G, and 22B overlap in plan view and black is displayed by the stacked substance. As a result of stacking the respective colored layers, in the inter-dot region, the thickness of the color filter 22 is determined by the amount the respective colored layers are stacked.

Furthermore, the insulating film 26 that is the liquid crystal layer thickness-adjusting layer is formed on the color filter 22 in the position corresponding to the reflective display region R. The common electrode 9 made of the ITO is formed on the surface of the lower substrate 10 including the surface of the insulating film 26. The protrusions 28, 29a, and 29b are formed on the common electrode 9. Also, the protrusions 28 are provided in the transmissive display region T. The protrusions 29b are provided in the reflective display region R. On the other hand, the protrusions 29a are provided in the inter-dot region.

As mentioned above, in the region where the respective colored layers 22R, 22G, and 22B of the color filter 22 overlap each other, the insulating film 26 protrudes by the amount the colored layers are stacked. Furthermore, the protrusions 29a that protrude to the liquid crystal layer 50 are formed in the portion where the insulating film 26 protrudes. The protrusions 29a are made of the same material as the protrusions 28 formed in the transmissive display region T and the protrusions 29b formed in the reflective display region R and have the height almost equal to the height of the protrusions 29b.

Next, in the upper substrate 25, the pixel electrode 31 in a matrix, which is made of a transparent conductive film, such as ITO, and an alignment film 33, which is made of polyimide and on which the vertical alignment process is performed like on the lower substrate 10, are formed on a substrate main body 25A made of a light transmissive material such as glass or quartz (on the liquid crystal layer of the substrate main body 25A). Also, like in the first embodiment, the slits 32 formed by partially cutting the pixel electrode 31 are formed in the pixel electrode 31.

In the liquid crystal display device 200 according to the present embodiment, in order to control the alignment of the liquid crystal molecules of the liquid crystal layer 50, that is, as a device for controlling the directions in which the liquid crystal molecules that are vertically aligned in an initial state fall when a voltage is applied between electrodes, protrusions made of a dielectric material are formed on the internal surface (the liquid crystal layer) of the electrodes. In the example of FIG. 4, the protrusions 28 and 29b are formed on the internal surface (on the side of the liquid crystal layer) of the common electrode 9 formed in the lower substrate 10 in both of the transmissive display region T and the reflective display region R.

The respective protrusions 28 and 29b are generally cone-shaped or polypyramid-shaped so as to protrude from the internal surface of the substrate (the main surface of the electrode) to the inside of the liquid crystal layer 50. The height L2 of the protrusions 28 formed in the transmissive display region T is (for example, about 1.5 to 2 times) larger than the height L1 of the protrusions 29 formed in the reflective display region R. To be specific, L2=2.0 μm and L1=1.0 μm. In this case, the height of the protrusions 28 is about 2 times larger than the height of the protrusions 29. Also, the protrusions 28 and 29 include at least a surface (including a slowly curved shape) tilted at a predetermined angle with respect to the internal surface of the substrate (the main surface of the electrode) to control the direction in which the liquid crystal molecules(LC) fall along the tilted surface.

Figure 4A:
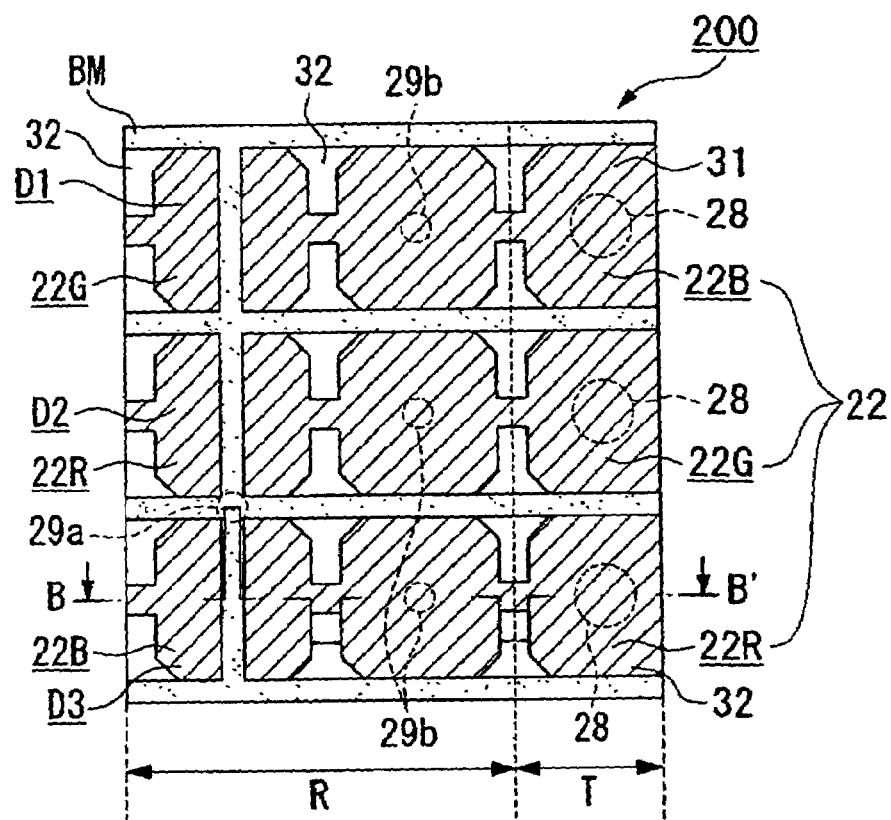
FIG. 4 is a plan schematic view and a sectional schematic view illustrating the enlarged main portion of a liquid crystal display device according to a second embodiment.

On the other hand, in the pixel electrode 31 formed on the internal surface of the upper substrate 25, the slits 32 obtained by partially cutting the pixel electrodes are formed. A distorted electric field is generated between the respective electrodes 9 and 31 by providing the slits 32. The directions in which the liquid crystal molecules vertically aligned in an initial state fall when a voltage is applied are controlled by the distorted electric field. Also, as illustrated in FIG. 4(a), the slits 32 formed in the pixel electrode 31 are formed to surround the protrusions 28 and 29 formed in the common electrode 9. As a result, it is possible to radically control the directions in which the liquid crystal molecules (LC) fall along the periphery of the protrusions 28 and 29.

Furthermore, in the liquid crystal display device 200 according to the embodiment, on the side of the liquid crystal layer 50 of the region formed by overlapping the colored layers 22R, 22G, and 22B, the protrusions 29a that protrude from the insulating layer 26 that is the liquid crystal layer thickness-adjusting layer to the liquid crystal layer 50 are formed. Therefore, the protrusions 29a are used as the device (instead of the spacers) for controlling the thickness of the liquid crystal layer 50. That is, the region formed by overlapping the colored layers 22R, 22G, and 22B protrudes above the other regions by the amount the colored layers overlap. However, when the insulating layer 26 is formed so as to cover the overlapped colored layers and the protrusions 29a are further formed, the protrusions 29a protrude outermost inside the substrate. As a result, it is possible to use the protrusions 29a as the means for controlling the thickness of the liquid crystal layer. Therefore, it is possible to maintain the thickness of the liquid crystal layer to be uniform in the substrate without additionally providing the spacers.

Also, the protrusions 29a are formed in the same process as the protrusions 28 and 29b formed in the transmissive display region T and the reflective display region R in order to improve the manufacturing efficiency and have the height almost equal to the height of the protrusions 29b. Therefore, it is possible to use the protrusions 29a as the device for controlling the thickness of the liquid crystal layer and to prevent the protrusions 28 and 29b formed in the transmissive display region T and the reflective display region R from contacting the opposite substrate 25. Therefore, it is possible to control the alignment of the liquid crystal molecules.

According to the liquid crystal display device 200 having the above structure, it is possible to obtain several effects that the liquid crystal display device 100 according to the first embodiment has and to form the black matrix (BM) without separately using chromium. Therefore, it is possible to improve the manufacturing efficiency, to reduce manufacturing costs, and to prevent environments from being damaged due to the abandonment of the chromium. Also, since it is possible to control the thickness of the liquid crystal layer without additionally using the spacers, it is possible to improve the manufacturing efficiency and to reduce the manufacturing costs. Furthermore, it is possible to correctly control the alignment of the liquid crystal molecules by the protrusions 28 and 29b and to thus improve the visual characteristics of display.

Figure 4B:
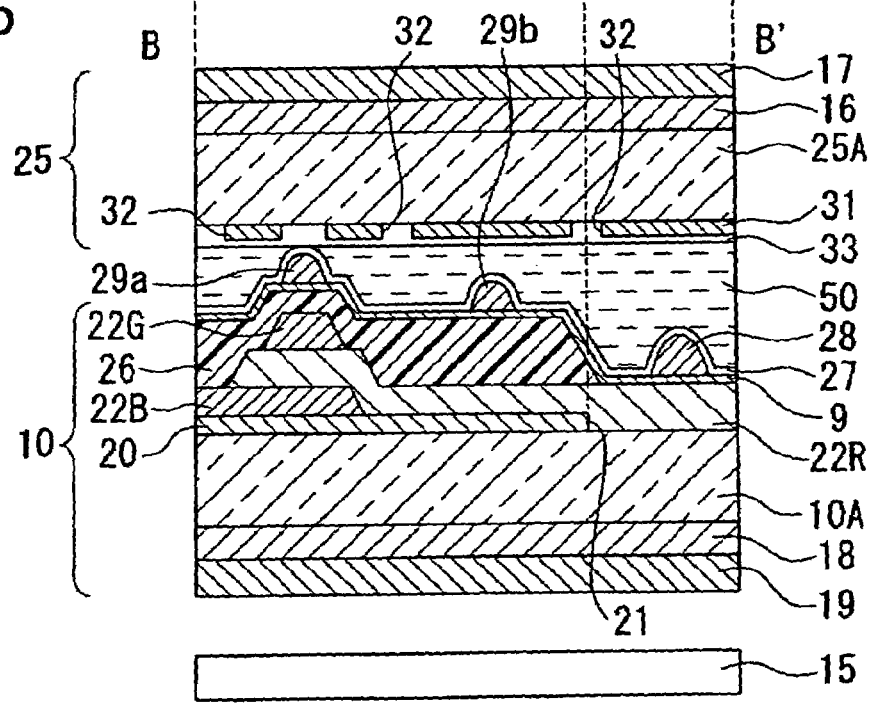

Next, one manufacturing process of the liquid crystal display device 200 according to the second embodiment will be described with reference to FIG. 4(b). The process of manufacturing the liquid crystal display device 200 includes a process of manufacturing the lower substrate 10, a process of manufacturing the upper substrate 25, and a process of attaching the lower substrate 10 to the upper substrate 25 with the liquid crystal material interposed between the lower substrate 10 and the upper substrate 25. The respective processes will now be described in detail.

First, the reflective film 20 mainly made of the metal material, such as A1, is formed on the base material corresponding to the substrate main body 10A in a predetermined pattern (in the region corresponding to the reflective display region R). Subsequently, the color filter 22 including the respective colored layers of the R, G, and B colors is formed on the almost entire surface of the substrate main body 10A having the reflective film 20. Also, in the process of forming the color filter 22, the respective colored layers 22R, 22G, and 22B overlap each other in the inter-dot region in plan view. Such a pattern can be formed using the photolithography method. Here, in the color filter 22, in the region where the respective colored layers 22R, 22G, and 22B overlap each other, the convex portions obtained by stacking the colored layers are formed.

After forming the color filter 22, the insulating film 26 that is the liquid crystal thickness controlling layer mainly made of the acryl resin is selectively formed so as to cover the color filter 22 in the region where the reflective film 20 is formed. In this case, the same convex portions are formed in the insulating film 26 in the inter-dot region in accordance with the above-mentioned convex portions of the color filter 22.

Then, on the substrate main body 10A having the reflective film 20, the color filter 22, and the insulating film 26, the transparent electrode 9 in strips is mainly made of the ITO by the deposition method. Also, the pattern in strips may be formed by the mask deposition or the etching.

Subsequently, on the transparent electrode 9 formed on the substrate main body 10A, the protrusions 29b, the protrusions 28, and the protrusions 29a formed of the dielectric material can be formed in the region where the reflective film 20 is formed, in the region where the reflective film 20 is not formed, and in the inter-dot region, respectively. Also, in particular, the protrusions 29a are formed in the convex portions of the insulating film 26. Here, the heights of the protrusions 28 and 29b that protrude from the surface of the transparent electrode 9 are different from each other. According to the embodiment, for example, the height L2 of the protrusions 28 is 2 times larger than the height L1 of the protrusions 29. The method of making the heights different is the same as that of the first embodiment. On the other hand, the protrusions 29a formed in the inter-dot region are formed in the same height controlling process as the protrusions 29b in order to make the protrusions 29a have the height almost equal to the height of the protrusions 29b formed in the reflective display region R.

On the almost entire surface of the transparent electrode 9 including the protrusions 28, 29a, and 29b formed by the above method, the alignment film 27 of vertical alignment, which is made of polyimide, is formed. Also, the alignment process such as rubbing is not performed on the alignment film 27.

On the other hand, on the surface opposite to the surface on which the transparent electrode 9 of the substrate main body 10A is formed, the retardation plate 18 and the polarization plate 19 made of the 1/4 wavelength plate are formed to thus obtain the lower substrate 10.

First, the transparent electrode 31 in a matrix, which is mainly made of the ITO, is formed on a base material corresponding to the substrate main body 25A by the sputtering method or the deposition method. Also, the pattern in a matrix may be formed by the mask deposition or the etching. The slits 32 are formed at the same time of forming the pattern in a matrix. Subsequently, the alignment film 33 of vertical alignment made of polyimide is formed on the almost entire surface of the transparent electrode 31 formed on the substrate main body 25A. Also, the alignment process such as rubbing is not performed on the alignment film 33.

On the other hand, the retardation plate 16 and the polarization plate 17 made of the 1/4 wavelength plate are formed on the surface opposite to the surface on which the transparent electrode 31 of the substrate main body 25A is formed to thus obtain the upper substrate 25.

The upper substrate 25 and the lower substrate 10 obtained by the above method are attached to each other under vacuum through the sealing material made of UV-hardening resin, in which the liquid crystal implanting hole is formed. The liquid crystal material is implanted into the attached substrates from the liquid crystal implanting hole by the vacuum implanting method. After implanting the liquid crystal material, the liquid crystal implanting hole is sealed by the sealing material to thus obtain the liquid crystal display device 200 according to the present embodiment. Also, according to the present embodiment, a liquid crystal material whose dielectric anisotropy is negative is used as the liquid crystal material.

Figure 5A:
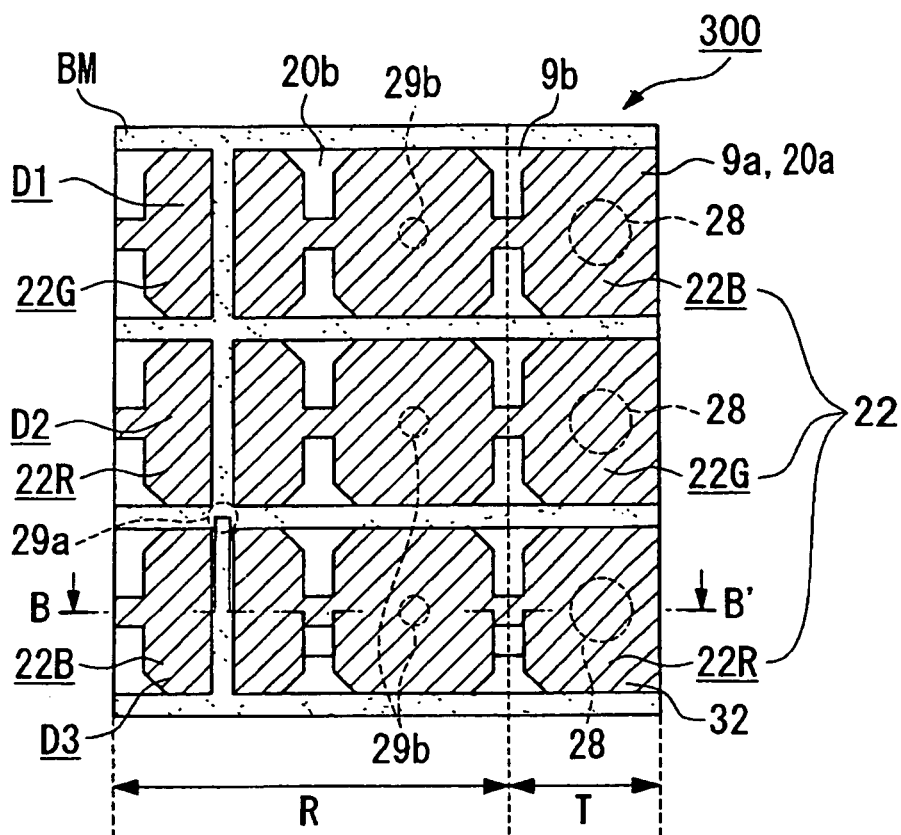
FIG. 5 is a plan schematic view and a sectional schematic view illustrating the enlarged main portion of a liquid crystal display device according to a third embodiment.
Figure 5B:
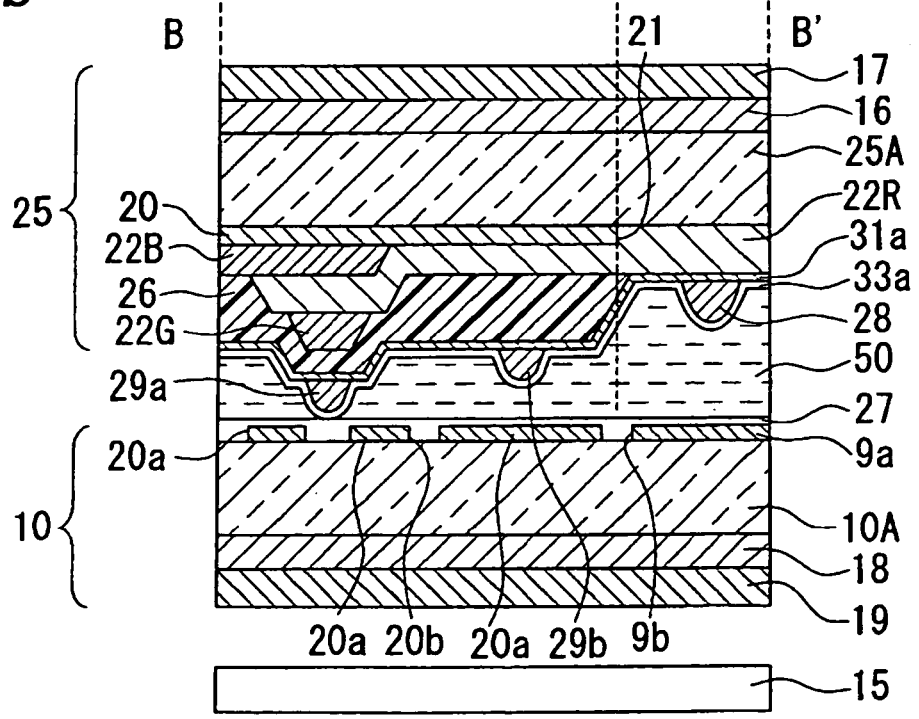

A liquid crystal display device according to a third embodiment will now be described with reference to the drawings. FIG. 5 is a schematic view illustrating the planar structure (a) and the sectional structure (b) of the liquid crystal display device 300 according to the third embodiment corresponding to FIG. 4 according to the second embodiment. The structure of the liquid crystal display device 300 according to the third embodiment is almost identical with the structure of the liquid crystal display device 200 illustrated in FIG. 4 excluding that the color filter 22 is formed in the upper substrate 25, as compared to the second embodiment. Therefore, description of the same members denoted by the reference numerals of FIG. 4 will be omitted.

According to the liquid crystal display device 300 according to the third embodiment, in an example of a transflective liquid crystal display device in an active matrix using a thin film transistor (TFT) as a switching element, liquid crystal whose molecules are vertically aligned in an initial state, that is, a liquid crystal layer 50 made of a liquid crystal material whose dielectric anisotropy is negative, is interposed between an lower substrate (an element substrate) 10 and an upper substrate (a counter substrate) 25 arranged to face the upper substrate.

In the lower substrate 10, the transflective film 20 made of the metal film having the high reflectance ratio, such as aluminum and silver, is selectively formed on the surface of the substrate main body 10A in a predetermined pattern, to be specific, in the reflective display region R. Furthermore, a transparent electrode 9a of a predetermined pattern is formed in the region where the reflective film 20 is not formed, that is, in the transmissive display region T. The reflective film 20 and the transparent electrode 9a make a pair to thus form a pixel electrode in a matrix. Also, slits 9b and 20b obtained by partially cutting the pixel electrode are formed in the pixel electrode so that the distorted electric field is generated in the slits 9b and 20b. Also, the alignment film 27 of vertical alignment is formed on the pixel electrode.

On the other hand, in the upper substrate 25, the color filter 22 including the region in which the respective colored layers 22R, 22G, and 22B overlap each other is formed on the surface of the substrate main body 25A. The insulating film 26 that is the liquid crystal layer thickness-adjusting layer and a common electrode 31a formed over the entire surface are provided on the color filter 22. Also, the protrusions 28, 29b, and 29a are formed on the common electrode 31a and in the transmissive display region, the reflective display region, and the inter-dot region, respectively. The structures of the protrusions 28, 29a, and 29b are the same as those of the second embodiment.

As mentioned above, according to the present embodiment, in the inter-dot region of the color filter 22 among the pixel electrodes, the black matrix (BM) obtained by stacking the respective colored layers 22R, 22G, and 22B is formed. To be specific, in the inter-dot region adjacent to the reflective display region R, the respective colored layers 22R, 22G, and 22B overlap each other in plan view and black is displayed by the stacked substance. Also, as a result of stacking the respective colored layers, in the inter-dot region, the thickness of the color filter 22 is determined by the amount the colored layers are stacked.

As mentioned above, according to the liquid crystal display device 300 including the color filter 22 in which the black matrix is obtained by stacking the respective colored layers 22R, 22G, and 22B in the upper substrate 25, it is possible to obtain several effects that the liquid crystal display device 100 according to the first embodiment and the liquid crystal display device 200 according to the second embodiment have. Description of the method of manufacturing the liquid crystal display device according to the third embodiment will be omitted since it is almost the same as the method of manufacturing the liquid crystal display device according to the second embodiment excluding that the color filter 22 is formed in the upper substrate 25.

Figure 6A:
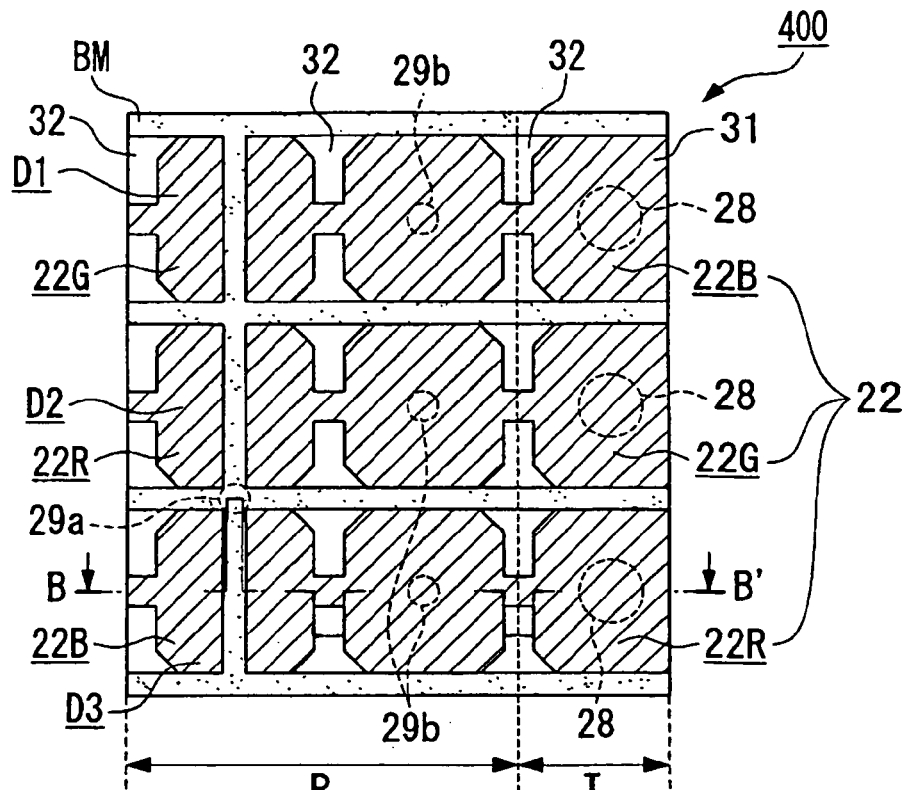
FIG. 6 is a plan schematic view and a sectional schematic view illustrating the enlarged main portion of a liquid crystal display device according to a fourth embodiment.
Figure 6B:
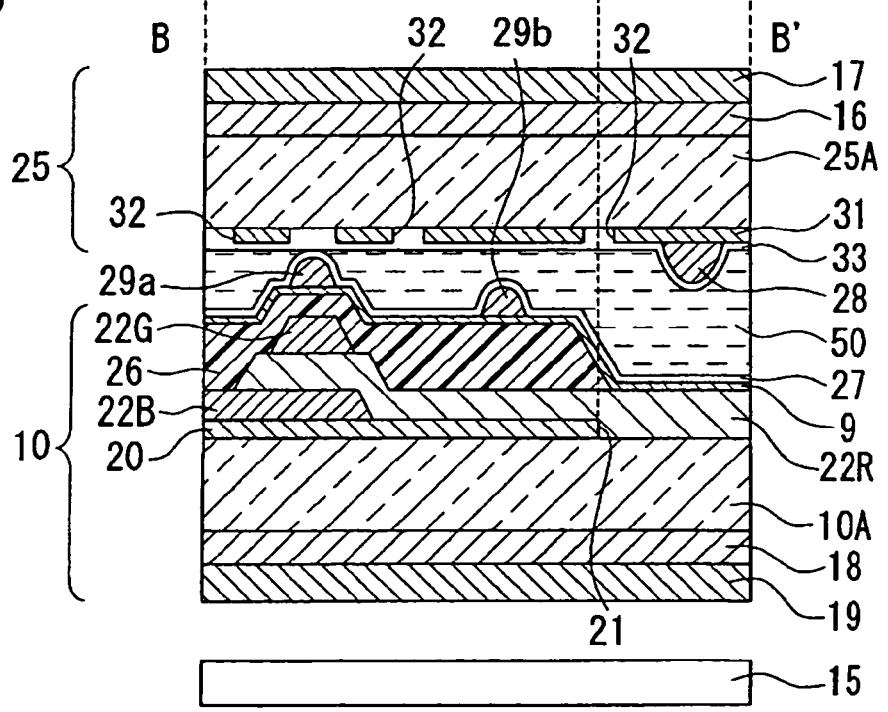

A liquid crystal display device according to a fourth embodiment will now be described with reference to the drawings. FIG. 6 is a schematic view illustrating the planar structure (a) and the sectional structure (b) of the liquid crystal display device 400 according to the fourth embodiment corresponding to FIG. 4 according to the second embodiment. The structure of the liquid crystal display device 400 according to the fourth embodiment is almost identical with the structure of the liquid crystal display device 200 illustrated in FIG. 4 excluding that the formed protrusions 28 are formed in the upper substrate 25 in the transmissive display region T, as compared to the second embodiment. Therefore, description of the same members denoted by the reference numerals of FIG. 4 will be omitted.

As mentioned above, it is not necessary to form the protrusions 28 and 29b for controlling the alignment of the liquid crystal molecules in the same substrate. Like in the embodiment, even when the protrusions are formed in the different substrates, it is possible to obtain the same effects as the effects that can be obtained when the protrusions are formed in the same substrate. Also, the protrusions 29a for controlling the thickness of the liquid crystal layer may be provided in any one of the upper substrate and the lower substrate.

A detailed example of an electronic apparatus including the liquid crystal display device according to the embodiment of the invention will now be described.

Figure 7:
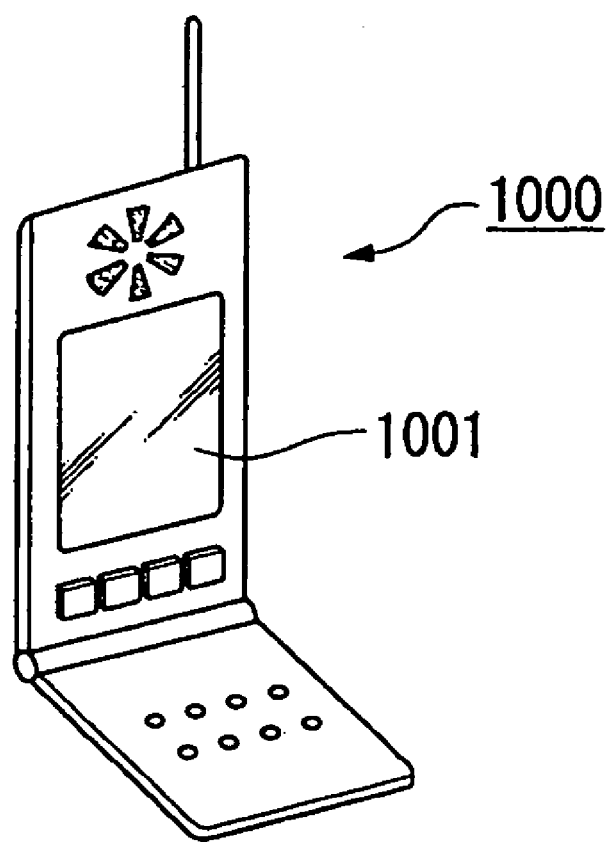
FIG. 7 is a perspective view illustrating an example of an electronic apparatus according to the present invention.

FIG. 7 is a perspective view illustrating an example of a mobile telephone. In FIG. 7, reference numerals 1000 and 1001 denote a mobile telephone main body and a display portion using the liquid crystal display device, respectively. Since such an electronic apparatus includes a display portion using the liquid crystal display device according to the present embodiment, it is possible to realize an electronic apparatus having a liquid crystal display portion with high contrast and a wide viewing angle, which is not dependent on use environments.

While this invention has been particularly shown and described with reference to preferred embodiments thereof, it should be understood by those skilled in the art that various changes in form and details may be made therein without departing from the spirit and scope of the invention. For example, according to the above embodiments, the retardation plate is a single plate, however, may be a stacked substance obtained by stacking a 1/2 wavelength plate and a 1/4 wavelength plate. The stacked substance functions as a wideband circular polarizer and can make black display achromatic. Also, the shapes of the protrusions and the electrode slits formed in the present embodiments are not limited to the structures of the above embodiments. The protrusions and the electrode slits may have any shapes suitable for controlling the directions in which the vertically aligned liquid crystal molecules fall.

What is claimed is:

1. A liquid crystal display device in which a liquid crystal layer is interposed between a pair of substrates, and a transmissive display region and a reflective display region are provided in one dot region,
the liquid crystal layer being made of liquid crystal whose dielectric anisotropy is negative,
a liquid crystal layer thickness-adjusting layer that makes a thickness of the liquid crystal layer in the reflective display region smaller than a thickness of the liquid crystal layer in the transmissive display region being formed between at least one substrate of the pair of substrates and the liquid crystal layer,
convex portions that protrude from internal surfaces of the substrates to the inside of the liquid crystal layer being provided in the transmissive display region and the reflective display region, and
a height of the convex portions being larger in the transmissive display region than in the reflective display region.

2. The liquid crystal display device according to claim 1, the convex portions being provided as an alignment regulating device that regulates an alignment of the liquid crystal and have surfaces inclined at a predetermined angle with respect to the surfaces of the substrate for interposing the liquid crystal layer therebetween.

3. The liquid crystal display device according to claim 1, electrodes that drive the liquid crystal being provided on the liquid crystal layer sides of the pair of substrates, and
the convex portions being formed on at least one electrode of the electrodes facing the liquid crystal layer.

4. The liquid crystal display device according to claim 3, an alignment film that vertically aligns the liquid crystal being formed on the convex portions and the internal surface of the electrodes facing the liquid crystal layer.

5. The liquid crystal display device according to claim 1, circular polarizers that make circularly polarized light incident on the liquid crystal layer being provided on the sides of the pair of substrates opposite to the liquid crystal layer, respectively.

6. The liquid crystal display device according to claim 1, an upper substrate and a lower substrate being provided as the pair of substrates,
a backlight for transmissive display being provided on the side of the lower substrate opposite to the liquid crystal layer, and
a reflective layer selectively formed in the reflective display region being formed on the side of the lower substrate facing the liquid crystal layer.

7. The liquid crystal display device according to claim 1, a color filter layer being provided on the liquid crystal layer sides of at least one substrate of the pair of substrates,
the color filter layer having a plurality of colored layers, and
the plurality of colored layers overlapping each other in an inter-dot region in plan view.

8. The liquid crystal display device according to claim 7, the liquid crystal layer thickness-adjusting layer and second convex portions that protrude from the liquid crystal layer thickness-adjusting layer to the liquid crystal layer being formed on the side of the liquid crystal layer in the region where the colored layers overlap each other in plan view.

9. The liquid crystal display device according to claim 8, the second convex portions being made of a same material as the convex portions formed in the transmissive display region and the reflective display region.

10. The liquid crystal display device according to claim 8, a height of the second convex portions being almost equal to that of the convex portions formed in the transmissive display region and the reflective display region.

11. A method of manufacturing the liquid crystal display device according to claim 1, comprising a convex portion forming step of coating a substrate with a photosensitive resin, and exposing and developing the photosensitive resin through a mask,
a thickness of the photosensitive resin with which the substrate is coated varying in every predetermined region.

12. The method of manufacturing the liquid crystal display device according to claim 11, further comprising a substrate fabricating step of forming a reflective film of a predetermined pattern on a base material,
a thickness of the photosensitive resin layer being relatively small in the region where the reflective film is formed.

13. The method of manufacturing the liquid crystal display device according to claim 1, comprising a convex portion forming step of coating a substrate with a photosensitive resin, and exposing and developing the photosensitive resin through a mask, an amount of exposure of the photosensitive resin varies with each predetermined region.

14. The method of manufacturing the liquid crystal display device according to claim 13, further comprising a substrate fabricating step of forming a reflective film of a predetermined pattern on a base material, the amount of exposure of the photosensitive resin in the region in which the reflective film is formed being different from an amount of exposure of the photosensitive resin in the region in which the reflective film is not formed.

15. The method of manufacturing the liquid crystal display device according to claim 11, further comprising a step of forming a color filter including a plurality of colored layers on a base material, in the color filter layer forming step, the plurality of colored layers overlap each other in an inter-dot region in plan view; and a step of forming an insulating layer so as to cover the colored layers that overlap each other and forming second convex portions protruding from the insulating layer, above the insulating layer, the convex portions and the second convex portions being formed in the same step.

16. A method of manufacturing a liquid crystal display device in which a liquid crystal layer is interposed between a pair of substrates and a transmissive display region, and a reflective display region are provided in one dot region, the method comprising:

a first substrate forming step of forming a reflective film of a predetermined pattern on a base material and forming an insulating layer on the region in which the reflective film is formed;

a convex portion forming step of forming convex portions on at least one of the first substrate and a second substrate different from the first substrate; and an attaching step of attaching the first substrate to the second substrate, with a liquid crystal layer therebetween whose dielectric anisotropy is negative, the convex portion forming step including the steps of coating at least one of the first substrate and the second substrate with the photosensitive resin, and exposing and developing the photosensitive resin through a mask, and a thickness of the photosensitive resin with which the substrate is coated in the region in which the reflective film is formed being different from a thickness of the photosensitive resin in the region in which the reflective film is not formed.

17. A method of manufacturing a liquid crystal display device in which a liquid crystal layer is interposed between a pair of substrates and a transmissive display region, and a reflective display region are provided in one dot region, the method comprising:

a first substrate forming step of forming a reflective film of a predetermined pattern on a base material and forming an insulating layer on the region in which the reflective film is formed;

a convex portion forming step of forming convex portions on at least one of the first substrate and a second substrate different from the first substrate; and an attaching step of attaching the first substrate to the second substrate, with a liquid crystal layer therebetween whose dielectric anisotropy is negative, the convex portion forming step including the steps coating at least one of the first substrate and the second substrate with the photosensitive resin, and exposing and developing the photosensitive resin through a mask, and an amount of exposure of the photosensitive resin in the region in which the reflective film is formed being different from the amount of exposure of the photosensitive resin in the region in which the reflective film is not formed.

18. An electronic apparatus, comprising the liquid crystal display device according to claim 1.

* * * * *